Aug. 29, 1933.    G. L. BOSSARD    1,924,395
CHIME
Filed March 23, 1932    6 Sheets-Sheet 1

Inventor
Gisbert L. Bossard
By Maréchal & Noe
Attorney

Aug. 29, 1933.   G. L. BOSSARD   1,924,395
CHIME
Filed March 23, 1932   6 Sheets-Sheet 2

Inventor
Gisbert L. Bossard
Maréchal & Noe
Attorney

Aug. 29, 1933.   G. L. BOSSARD   1,924,395
CHIME
Filed March 23, 1932    6 Sheets-Sheet 4

Aug. 29, 1933.   G. L. BOSSARD   1,924,395
CHIME
Filed March 23, 1932   6 Sheets-Sheet 5

Inventor
Gisbert L. Bossard
By Maréchal & Noe
Attorney

Aug. 29, 1933.  G. L. BOSSARD  1,924,395
CHIME
Filed March 23, 1932   6 Sheets-Sheet 6

Patented Aug. 29, 1933

1,924,395

UNITED STATES PATENT OFFICE 1,924,395

CHIME

Gisbert L. Bossard, Dayton, Ohio, assignor to General Kontrolar Company, Inc., Dayton, Ohio, a corporation of Ohio Application March 23, 1932. Serial No. 600,715

12 Claims. (Cl. 84—103)

This invention relates to electrically operated musical chimes and the like.

One object of the invention is the provision of an electrically operated chime of compact, sturdy and reliable construction, having novel means for operating the chime strikers to produce a predetermined sequence of sounds.

Another object of the invention is the provision of a chime of the character mentioned in which the solenoid means are controlled by an induction disk electric motor adapted to be connected to a low potential alternating current source, the solenoids being electrically energized by means of a series of contacts arranged in groups on the periphery of a contact disk over which a movable contact arm is moved by the motor.

Another object of the invention is the provision of an electrically operated chime adapted to be manually started, in which the chimes and chime operating mechanism are contained in a cabinet having provision for obtaining ready access to the chime operating mechanism for purposes of repair.

Another object of the invention is the provision, in a solenoid operated chime of the character mentioned, of a novel solenoid construction formed of a few simple parts that may be readily assembled together to provide an economical and yet reliable and sturdy construction.

Other objects and advantages of the invention will be apparent from the following description, the appended claims, and the accompanying drawings, in which—

Referring more particularly to the drawings, in which like numerals designate corresponding parts in the various views, it will be noted that the apparatus embodies a series of chime members, four of which have been shown, these chime members being adapted to be sounded by solenoid devices in some predetermined definite manner so as to give a pleasing sequence of sounds of different tones. For example, the chime may be so designed, upon being started, as to play some of the notes of the Westminster chimes. The switch controlling the energization of the apparatus, or the starting of the series of operations, may be provided in the usual location of the doorbell switch in a residence so that the chime can be used to indicate that someone is at the door and wants admittance; or other uses may be made of the chime, which may be controlled from any desired point. The present invention is an improvement on my prior application for Letters Patent Serial No. 558,737, filed August 22, 1931.

The four chime tubes 10, 11, 12 and 13 with which the apparatus is provided are supported on chime hangers 15, the several chime hangers being supported on post 16 provided on the outer side of a vertically extending supporting plate 17.

The supporting plate 17 on which the chime sounders are hung also supports the operating mechanism for the chime. The strikers for the chime tubes are the plungers or hammers of electrical solenoids designated generally 20, 21, 22 and 23 supported on the rear face of the plate 17. These solenoids provide passages for the reception of the plungers 24. The plungers are metal elements of such character that they will be drawn endwise of the solenoid coil passages when the coils are energized, and thus be forcibly moved against the chime tubes. Normally, however, these plungers are held in a retracted position as will be more fully explained.

Figure 12:
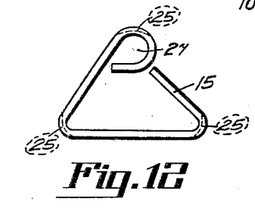
Fig. 12 is a detailed view of one of the chime hangers.

The chime hangers 15, one of which has been shown in detail in Fig. 12, is preferably made from a single sheet of metal bent into a substantially triangular form, the upper apex of the triangle being curved around to form an opening through which the post 16 extends. A screw 28 is threaded into the post 16 which is flanged at 29, these parts thus forming a rigid mounting for the triangle. The inner end of the post 16 may be riveted securely to the supporting plate 17. This provides a simple means for securing the various chime hangers 15 rigidly in their proper locations on the face of the supporting plate. Each triangle 15 is provided with notches 25 in the top and in the side corners, these notches partly receiving and locating the flexible suspending cord 30 which passes through a transverse hole 31 in the chime tube below its top end block or closure 32. It will be noted that the lower side of the triangle 15 is of greater extent than the diameter of the tube so as to hold the suspending cord away from the upper end of the chime tube, and permit the chime tube to vibrate freely. The chime tubes are hung so that they will be struck by the plungers of the solenoids a little distance below the top ends of the tubes.

Figures 1, 2, 3, 4:
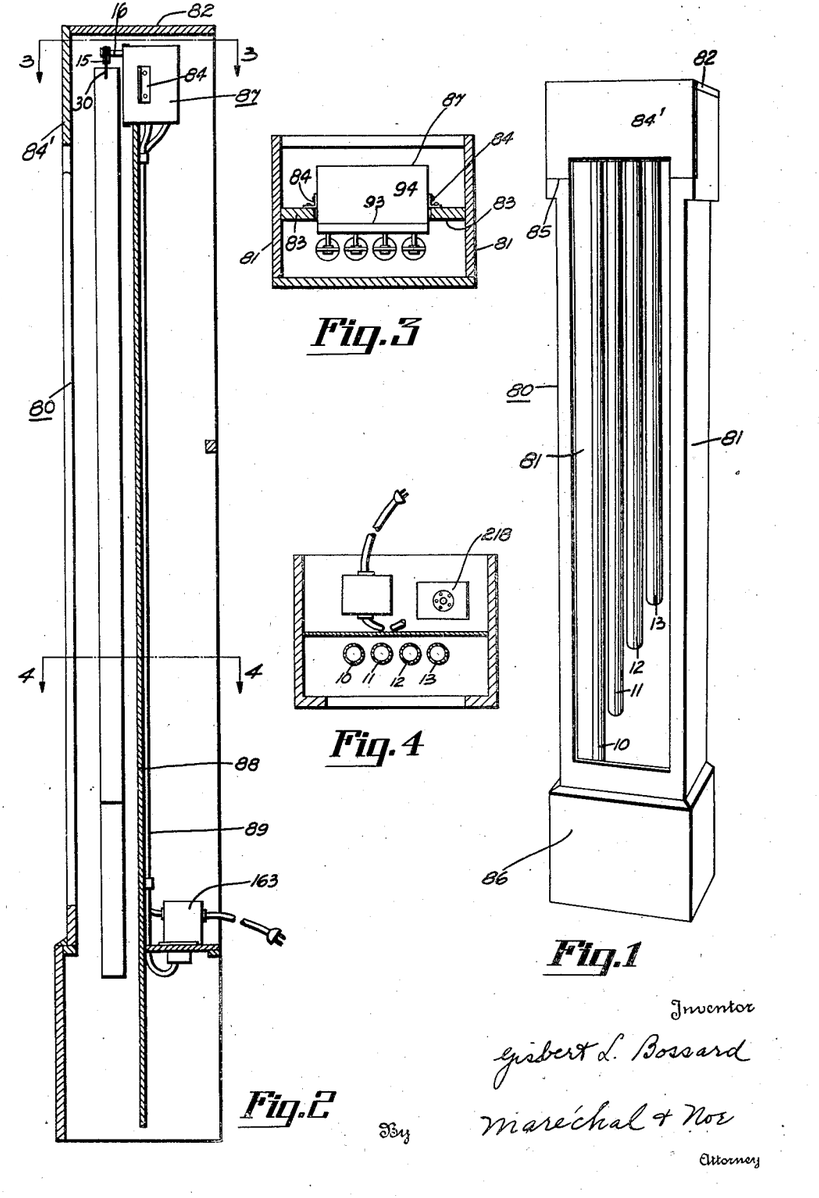
Fig. 1 is a perspective view of an electrical chime embodying the present invention.
Fig. 2 is a central vertical section through the chime cabinet.
Fig. 3 is a horizontal section on the line 3—3 of Fig. 2.
Fig. 4 is a horizontal section on the line 4—4 of Fig. 2.
Figures 5, 15, 16, 17, 18:
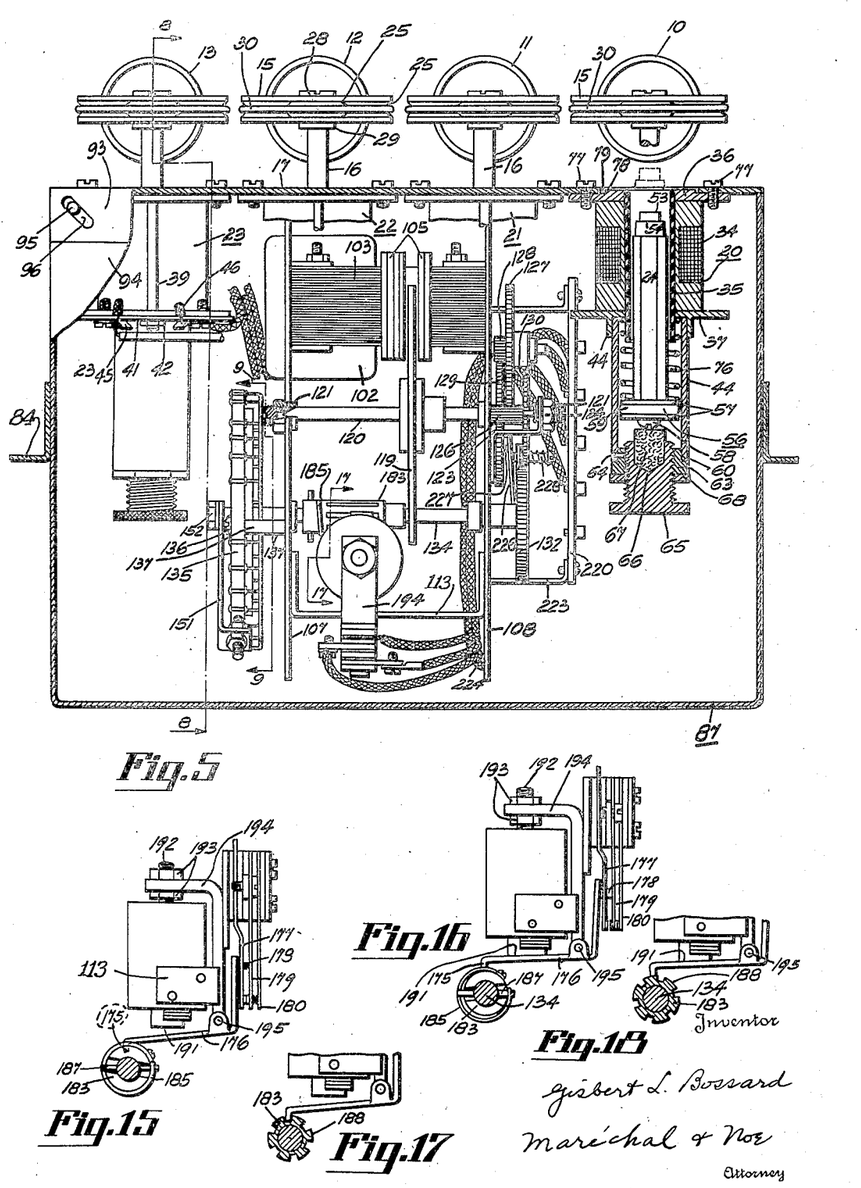
Fig. 5 is a top plan view of the chime operating mechanism, showing one of the solenoids in section.
Fig. 15 is a side elevation of the circuit controlling magnet, the parts being shown in their positions when the motor is at rest.
Fig. 16 is a similar view of the circuit controlling magnet, showing the magnet energized.
Figs. 17 and 18 are sectional views on the line 17 of Fig. 5, corresponding to the position of the parts as illustrated in Figs. 15 and 16 respectively.
Figures 6, 7:
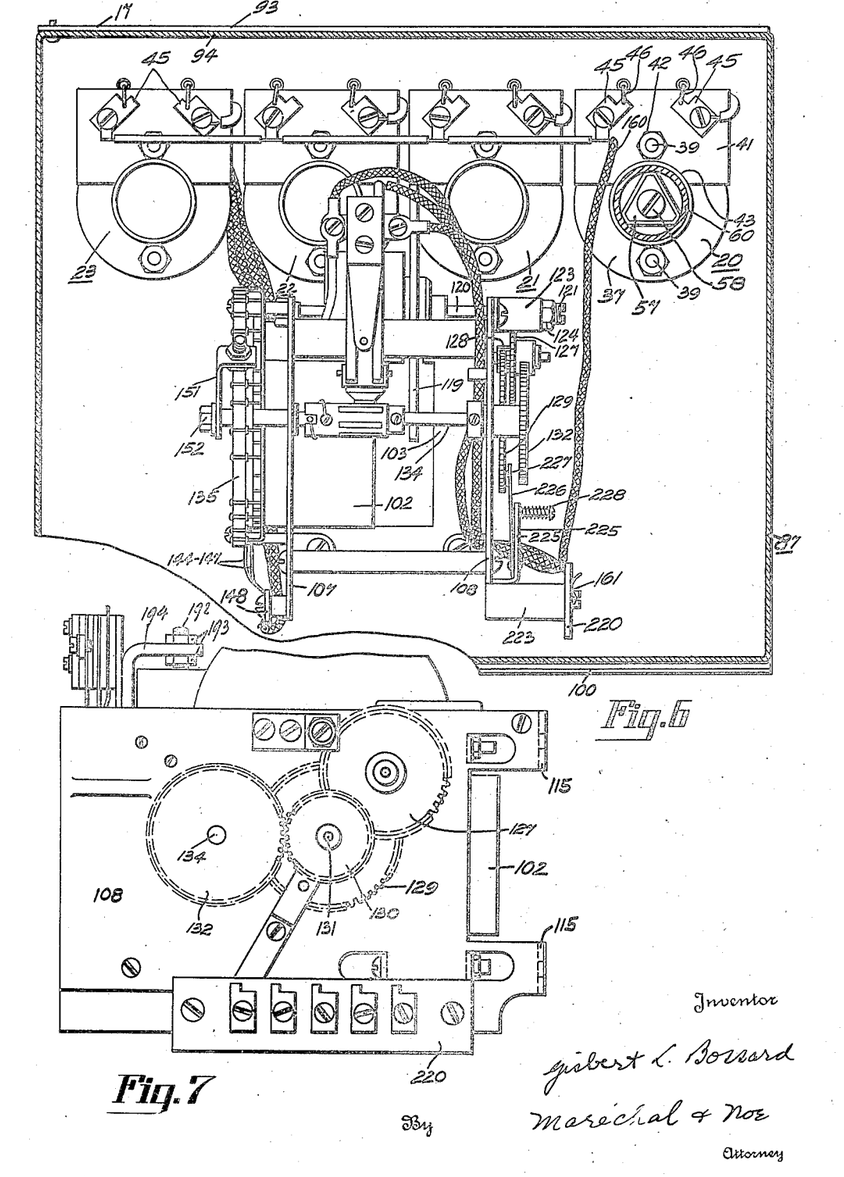
Fig. 6 is a rear view of the chime operating mechanism.
Fig. 7 is a side view of a part of the motor mechanism of the chime.

The solenoids themselves are of novel construction. As shown in Figs. 5 and 6, the solenoid 20 embodies a coil or winding 34 having a central passage in which is a tube 35 of insulating material, this tube going freely through the passage provided in the coil and holding the coil in place. The tube 35 projects at one end into a groove or seat in the end portion 36 and extends through a passage in the end portion 37 of the metal solenoid core structure. The two end portions 36 and 37 of the solenoid structure are connected together by bolts or studs 39, which may be arranged on opposite sides of the coil and which not only serve to mechanically interconnect the metal ends of the solenoid, but also to serve as a return magnetic flux path. The bolts 39 and the solenoid end portions 36 and 37 are of ferrous material such as iron, and it will be noted that all of these parts are of very simple formation and capable of being very easily and cheaply produced and readily assembled into the completed structure. One of the screws or bolts 39 passes through an insulating strip 41, which is secured by the bolt nut 42 to one side of the end portion 37 of the solenoid. The insulating strip has a curved cut-out portion 43, see Fig. 6, which fits on the cylindrical upper side of the boss 44 provided on the end portion 37. The insulating strip is provided with metal tabs 45 to which connecting wires may be soldered, these tabs 45 being connected to the insulated leads 46 of the winding 34. The assembly of the insulating tube with its end portions, and the mechanical and electrical connections of the parts is very easily accomplished.

Within the solenoid tube 35 is the solenoid plunger 24. This plunger has a central body portion of iron or other magnetic material on the end of which is a striking pad 53 of leather or the like, held in place by a cap piece 54 preferably of brass. At the other end of the body portion of the plunger is a guide end 56 preferably formed by triangular shape plates 57 held in place by a screw 58 and holding between them a pad 59 of suitable fibrous material. The plates 57 and the pad 59 are shaped to have a plurality of comparatively smooth guide surfaces that slide or rest on a guide tube 60, see Fig. 6. The tube 60 is made of brass or other non-magnetic substance and is secured in the end portion 37 of the solenoid element in axial extension of the tube 35. The interior diameter of the tube 60 is such as to prevent any misalignment of the axis of the plunger with respect to the axis of the solenoid coil. The body portion of the plunger is preferably of hexagonal form, the edge portions being rounded so as to give several substantial points of contact in sliding engagement with the tube 35 with which it forms a rather close but sliding fit.

In the outer end of the tube 60 is secured an interiorly threaded ring 63, these two parts being preferably held together by a pin 64. A threaded plug 65 engages the interior threads of the part 63 in such a way as to permit endwise movement of the plug with relation to the tube. The inner end of the plug 65 is recessed as indicated at 66 and holds a soft pad 67 which forms a stop against which the outer end of the solenoid plunger can strike and which absorbs the shock when the plunger returns to its normal position of rest. Threaded on the plug is a lock nut 68 cooperating with the ring 63 to hold the plug in any position of adjustment.

The plunger 24 of the solenoid normally is held back yieldingly against the soft abutment pad 67. For this purpose a spring 76, preferably spiral in form, is provided around the solenoid plunger, one end of the spring being centralized by means of the end of the tube 35 which projects a little distance out into the tube 60 as shown in Fig. 5. The other end of the spring bears against one of the plates 57, the diameter at this end of the spring being somewhat less than the other end and only slightly larger than the plunger diameter in order that the spring may be compressed to a very small overall length when the coil is energized and the plunger is drawn to the left. The normal position of the plunger, against the abutment pad 67, has been shown in Fig. 5. However, when the coil 34 is energized the pull of the solenoid causes the plunger to be moved past the dotted line position indicated, to strike the chime tube 10, although it is, however, withdrawn instantly from striking engagement with the tube to the position shown in dotted lines where it remains until the coil is deenergized. It is withdrawn to the dotted line position from contact with the chime tube because the total length of the iron body portion of the plunger is so coordinated with the total length of the iron solenoid core element as to provide a coil energized position in which the striking end of the plunger is spaced a little distance away from the chime tube. The solenoid plunger travels past this position when the coil is energized, by reason of its inertia, and then returns to a spaced position if current continues to flow in the solenoid coil so that the plunger is prevented from striking twice or from holding against the tube and thus interfering with the free vibration of the tube.

The several solenoids are secured to the rear side of the supporting plate 17 by means of attaching screws 77 that are threaded into the end portions 36 of the solenoids. These end portions are provided with outwardly flanged ends 78 which project into the four openings 79 in the supporting plate.

Figure 24:
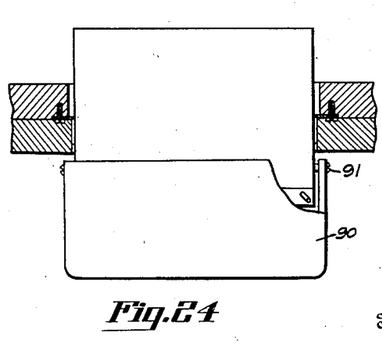
Fig. 24 is a top plan view of a chime housing with a protecting cover for the upper ends of the chimes, partly in section.
Figure 25:
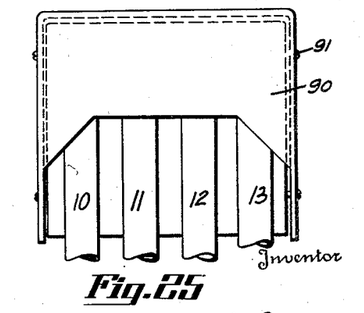
Fig. 25 is a front view of the chime apparatus showing the protecting cover.

The supporting plate 17 preferably forms the front plate of an outlet box or housing designated generally 87. This may be recessed in the wall of a building in which the apparatus is located so as to leave only a small portion of the outlet box projecting from the surface of the wall. When so used the outlet box is provided with a cover plate 90 as shown in Figs. 24 and 25 which is detachably supported on the sides of the box by means of a suitable slip joint connection with projecting screws 91, this cover plate 90 hiding the upper ends of the tubes, presenting a pleasing appearance, and also forming a protection. In accordance with the construction shown in Figs. 1 to 4, however, the box or housing 87 is mounted in the upper end of a partly closed upright cabinet 80 which protects the chime tubes and the mechanism and which holds them as a self-contained unit formed as an article of furniture that can be moved from place to place as desired.

The cabinet 80 is provided with spaced sides 81 that extend up to the top or cover wall 82. To the portions mentioned are secured supporting blocks 83 that serve as supports for the angle irons 84 on the sides of the chime housing box. The chime tubes are protected at the upper end of the housing by a top front plate or wall 84' which is preferably formed as a hinged door movable downwardly about the hinge axis 85 so as to permit ready access to the chimes and to the chime mechanism. The door may be held in its normal closed position by a suitable snap catch or fastener. The space between the side walls 81 and below the top front door 84' preferably receives a lattice or grill which, however, permits the sound of the chimes to be readily heard. As the total depth of the cabinet is quite substantial, the space behind the chime tubes is blanked off by an intermediate cabinet wall 88 which serves the purpose of concealing the wiring 89 that extends up to the under side of the housing box 87. A transformer 163 is supported on a shelf at the lower side of the cabinet, and the electrical connection wires extend out from the rear of the cabinet to any suitable point. The cabinet may thus be placed in any desired position in a room, the electrical connections being readily made to the wires that extend out through the rear of the cabinet. Beside the transformer 163 a connection plate 218, see Fig. 4, by means of which individual key mechanism may be readily connected when desired, the function of this plate being set forth more fully later on.

The supporting plate 17 is rearwardly flanged at 93 along its upper edge, the flange thus provided resting on the forward side of the top wall 94 of the box and forming a support for the entire mechanism held by the plate 17 when the latter is in its normal position closing the open side of the box. The plate is hinged so that it can swing about a vertical axis, being connected by suitable pivot connections adjacent one vertical side of the plate 17 and a forward outer corner of the box. A suitable arrangement providing for this hinging or swinging movement of the plate 17 is shown in Figs. 3, 5, 22 and 23, it being noted that a pin 95 fixed to the box 87 projects up through a slot 96 arranged at an angle with the front side of the plate 17 so that the latter can be swung open and at the same time move a little distance laterally and forwardly with relation to the box during this opening movement. Directly below the pin 95 and slot 96 is a similar pin and slot arrangement provided by a movable pin 97 pressed downwardly by a spring 98 so as to engage a slot 99 in the horizontally extending bottom flanged portion 100 of the plate 17. The cover plate 90 which may be entirely omitted when the chime mechanism is mounted in the cabinet as illustrated in Figs. 1 to 4 inclusive, may be readily removed, and when it is out of the way the supporting plate 17 and the mechanism on it can be swung out, when the door 84 of the cabinet is lowered into a position where the parts of the apparatus are readily accessible for adjustment or repair.

The four solenoids of the chime apparatus are automatically energized in some predetermined sequence under the control of an electric motor. As herein shown, this motor is of the shaded pole induction disk type which forms a very desirable drive for the apparatus inasmuch as it is a low voltage, low power motor exceedingly economical in current consumption, quite cheap in construction, and very reliable in operation. The shaded pole induction magnet of the motor comprises a coil 102 provided around the laminated core element 103 which is shown in the form of a number of substantially L-shaped laminations interleaved at their ends and providing a spaced pole piece 104 on which there are suitable shading rings 105. The various laminated plates or pieces of the core are secured directly to two parallel supporting plates 107 and 108, each of which has outwardly projecting tabs or ears 109, preferably formed as integral stamped-out portions of the plates themselves. These outwardly extending ears or projections are arranged in pairs on each plate, and a pair of projections on one plate is arranged exactly opposite a pair of projections on the other plate so as to hold the laminated metal strips between them. They are provided with holes that receive screws 110 projecting also through holes at the corner positions and extending parallel to the supporting plates so that they are readily accessible. They connect the core laminations directly to the plates so as to prevent any misalignment and to insure an exact positioning of the plates and core pieces. At suitable points spaced from the core laminations, spacing studs 112 and a bar 113 space the plates a corresponding distance apart. The plates 107 and 108 are sheet metal stampings, the various projections, ears, tabs and holes being stamped from a metal blank preferably in a single operation. The ends of the plates that are adjacent the supporting plate 17 are integrally flanged and footed as indicated at 115, these feet abutting against the inner side of the supporting plate, to which they are secured by suitable screws 116. Pads of soft rubber 117 are preferably employed between the feet 115 and the plate 17, and an insulating tube surrounds the screws and insulates them from the plate 17, as well as preventing the transmission of the sounds of the mechanism to the plate 17.

Operating between the spaced pole faces 104 of the electromagnet is a rotatable disk 119 secured on a shaft 120 which is mounted at its ends by means of trunnion ball-bearings held in ball-bearing supports 121 that are preferably threaded in the plates 107 and 108. The portion of the plate 108 in which its ball-bearing support 121 is provided is a bracket member 123 fixed on the plate by connecting screws or the like. An adjusting nut 124 on each of these bearing supports 121 provides for accurate adjustment of the bearings and definitely locates the shaft 120 in such a way as to prevent any vibrational noise that would otherwise be generated by the motor when energized by alternating current. Vibrational noises would, of course, be extremely undesirable in a musical instrument of this character.

Provided on the shaft 120 preferably between the outer side of the plate 108 and the bracket 123 is a small driving pinion 126 engaging and driving a gear 127. Fixed to gear 127 is a pinion 128 that engages and drives a gear 129 fixed to a gear 130 and rotatable about an axis 131. Gear 130 meshes with and drives a gear 132 which is fixed to a stop shaft 134. This shaft operates rather slowly due to the gear reduction between the comparatively rapidly moving shaft 120 and shaft 134.

Figure 8:
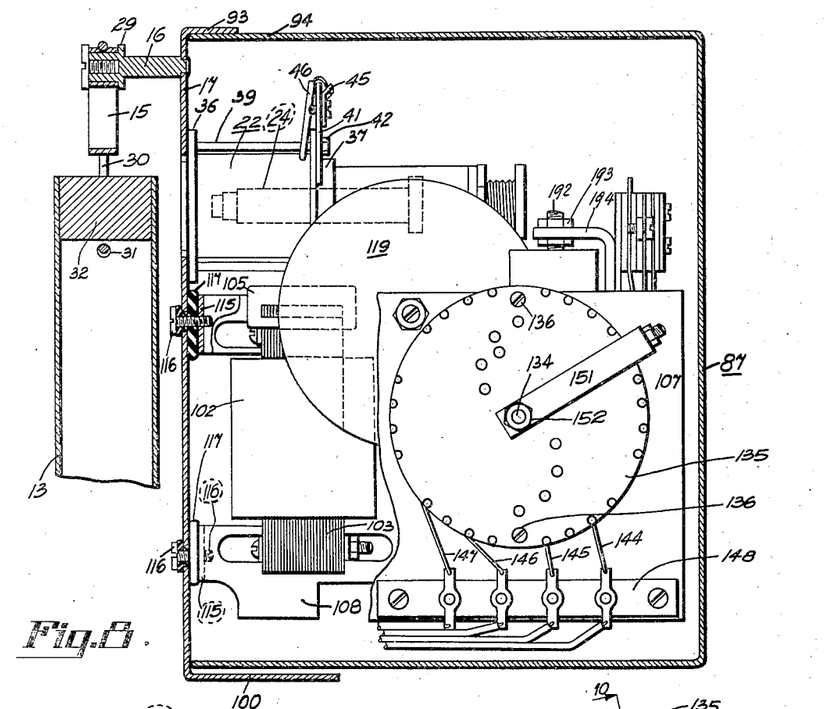
Fig. 8 is a side view shown partly in section, taken on the line 8—8 of Fig. 5, some of the parts being broken away.
Figure 9:
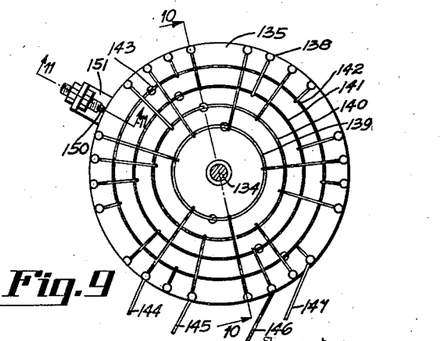
Fig. 9 is a section on the line 9—9 of Fig. 5.
Figure 10:
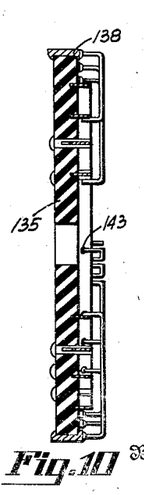
Fig. 10 is a section on the line 10—10 of Fig. 9.
Figure 11:
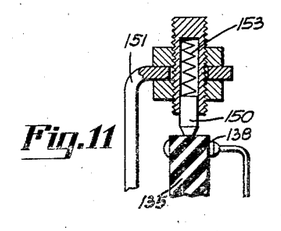
Fig. 11 is a detailed section on the line 11—11 of Fig. 9.

The shaft 134 in operating through a predetermined angular movement, automatically controls the energization of the chimes in some predetermined manner so as to give a desired sequence of chime sounds. In accordance with the present invention, the means by which the various chimes are automatically controlled embodies a rotatable contact member and a series of contacts embedded in the periphery of a disk of insulating material, the various contacts being connected in groups to the several chimes. The insulating disk has been designated by the numeral 135 in Figs. 5, 8 and 9. This disk is preferably centered on the projecting end of the shaft 134, which passes through a clearance hole in the center of the disk. The disk is mounted in fixed position by means of screws 136 which extend through it and are threaded in the plate 107, spacing sleeves 137 holding the disk a suitable distance away from the plate. Embedded in the periphery of the disk are the contact elements 138, these contact elements being preferably in the form of round wires or small bars provided in holes of corresponding size in the insulating disk, the surfaces of the disk and the wires being finished so as to provide a perfectly cylindrical contour in which the conducting parts are embedded flush with the surface of the insulating portions. The contacts 138 are shown arranged in six groups of four each, four contacts of each group being connected electrically to the four chime solenoids. The corresponding contacts in each group are connected together, in sets of four since all the contacts are connected to the four metal distributing rings 139, 140, 141 and 142. These rings project toward the plate 107 from the inner side of the insulating disk, being pinned to the insulating disk by split pins 143. The headed ends of the contact elements 138 are soldered to wires that extend to the several distributing rings. Wires 144 to 147 inclusive connect to the rings 139 to 142 as shown in Figs. 8 and 9 and extend to metal connections on an insulating bar or connection strip 148 secured to the lower side of the plate 107.

The smooth peripheral surface of the disk is traversed by a contact element 150 electrically connected to the arm 151 which is fixed to the projecting end of the shaft 134 by means of a nut 152. The contact element 150 is pressed by a spring 153 toward the axis of rotation and thus held against the periphery of the insulating disk and the contact elements in a yielding manner. The force of the spring, however, is not very great so as not to impose a large frictional resistance to the movement of the arm. It will be understood that in this way the various contacts on the periphery of the insulating disk may be swept over by the contact element at a uniform rate of speed and without imposing any substantial force tending to restrain the comparatively low power of the motor or to affect its speed of operation. Any variations of the disk from a true flat surface due to warping, for example, that might be present would have no effect on the good contact that obtains on the cylindrical surface of the disk, and would offer no increased resistance to the action of the motor.

Figure 13:
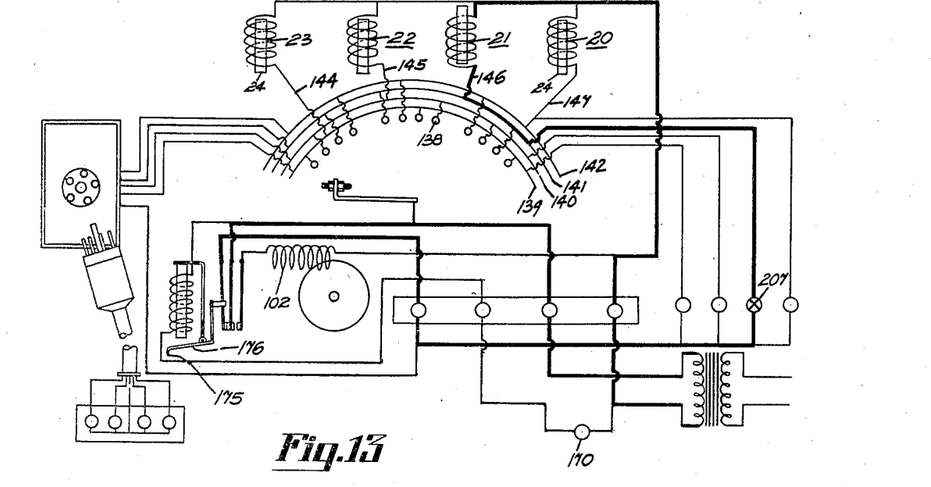
Fig. 13 is a diagrammatic view of the electrical connections, showing one of the individual or selective control switches energized.

The four solenoids, as shown in Fig. 13 which illustrates the electrical connections, are electrically connected to the distributing rings 139 to 142 inclusive by means of the wires 144 to 147, the other ends of the solenoids being connected together by a common wire 160 leading to a connection 161 from which a wire extends to the lower side of the low voltage secondary 162 of the transformer 163 that has already been referred to. The primary of this transformer may be supplied with 110 volt alternating current. The secondary is of low voltage, the upper side of the secondary winding being connected through wire 164, connection 165 and wire 166 to the arm 151 that connects successively to the various chime solenoids and thus energizes them in succession as the arm sweeps over the disk for a predetermined angular travel.

Figure 14:
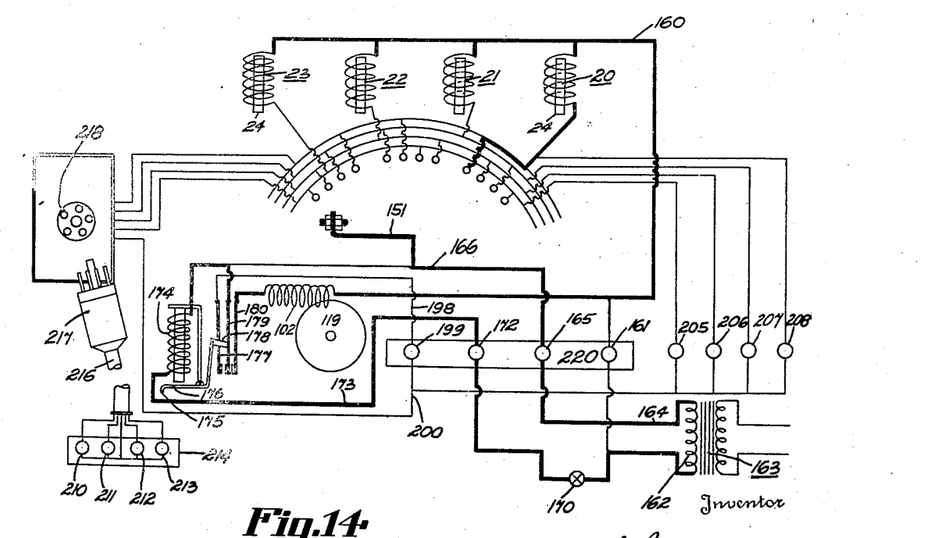
Fig. 14 is a similar view of the electrical connections but showing the motor controlling switch closed.
Figure 19:
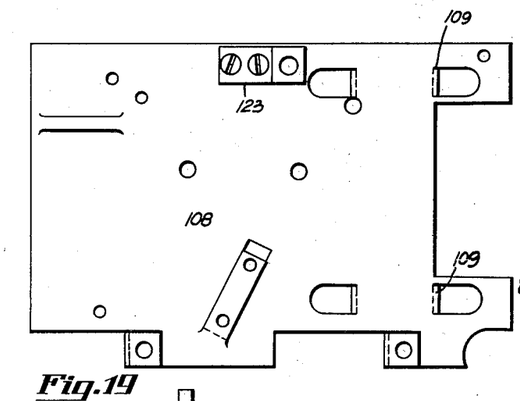
Fig. 19 is a detail view of one of the motor supporting plates.
Figure 20:
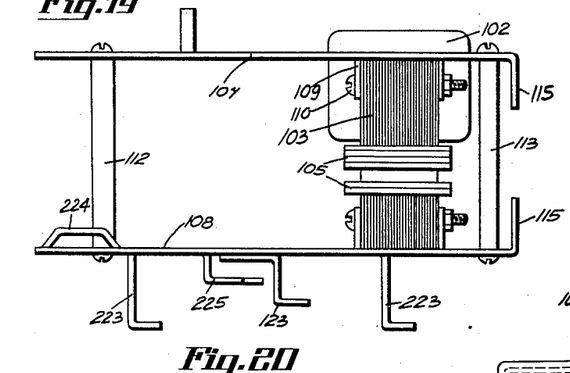
Fig. 20 is a top plan view of the induction disk magnet and its supporting side plates.
Figure 21:
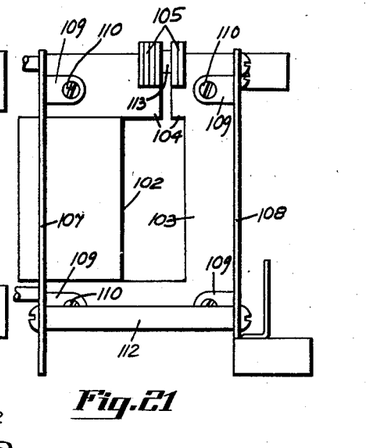
Fig. 21 is a rear elevation of the parts shown in Fig. 20.
Figure 22:
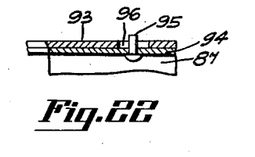
Figs. 22 and 23 are detailed views of the hinge arrangement.
Figure 23:
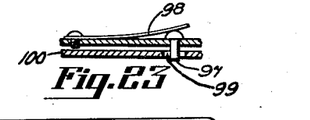

The electric motor is adapted to be started by means of a manually operated push bottom or control switch 170 which is preferably provided outside the dwelling entrance if the chime apparatus is to be used to give an indication when someone is at the entrance of the building. The winding 102 of the motor coil is automatically connected across the secondary 162 of the transformer when this switch 170 is closed. The switch 170 is provided in a controlling circuit comprising the secondary of the transformer, the switch 170, connection 172, wire 173, circuit controlling coil 174, wire 166, connection 165, wire 164 and back to the transformer secondary. The switch 170 thus closes a low voltage circuit through the circuit control magnet 174. Fig. 14 shows the energized parts of the apparatus when the switch 170 is closed.

The energization of the magnet 174 has several effects. In the first place it releases a stop or holding means that normally prevents rotation of the shaft 134, a stop projection 175 being provided on its pivotally supported armature 176 in such a way as to be withdrawn from effective engagement with a stop collar on the shaft 134 when the armature 176 is attracted. This armature is substantially L-shaped, having an upstanding portion on which is an insulated nose projection 178. This projection extends through a slot in a blade 177 and makes contact between the two blades 179 and 180 by pressing against the blade. These blades 179 and 180 form a switch for completing the motor circuit, connecting the motor coil 102 across the secondary of the transformer 163, the connections being through the connection 165, blade 179, blade 180, to the motor coil 102, the return circuit being through the connection 161 to the lower side of the transformer.

The circuit controlling magnet 174 controls the switch that connects the motor across the transformer, and need be energized only for a second or so in order that the motor might be started, the arrangement being such that if the button 170 is released after only being pressed for a short period, the motor circuit will be maintained until the completion of a cycle of operations, after which the motor will be stopped automatically. The stopping of the motor is accomplished by engagement of the stop projection 175 on the armature with a slot provided in the stop collar 183. There are six of these slots in the collar 183, the slots corresponding in angular spacing and arrangement in accordance with the arrangement of the groups of contacts on the insulating disk. The stops are so positioned as to be capable of receiving the end 175 of the pivoted armature at a time when the contact element 150 is intermediate two groups of contacts, thus causing the automatic stopping of the motor after a group of contacts has been traversed by the contact element 150. When the relay coil 174 is energized, and the stop projection 175 is withdrawn from its slot, the motor is then free to rotate and the motor circuit is completed at the same time so that the shaft 134 will be moved until a succeeding stop position is reached.

The collar 183 is loosely mounted on the shaft 134 for limited rotational movements thereon, suitable spring means 185 being provided between the shaft 134 and the collar to urge the collar in a counterclockwise direction on the shaft 134 as viewed in Fig. 17. When the armature projection 175 is brought into engagement with a notch of the collar, the momentum of the rotating armature causes the spring 185 to be tensioned as the armature stops, and the parts are as shown in Fig. 17, the holding force being transmitted from the collar through the stop pin 187 to the shaft 134, preventing rotational movements of the shaft.

When the circuit controlling magnet 174 is energized and its armature is attracted so as to withdraw the stop projection from its notch, the spring 185 swings the collar in a counterclockwise direction for a limited movement before any movement of the shaft 134 takes place, after which the shaft is rotated by the motor and the projection 175 then rides on the cylindrical surface 188 of the collar, maintaining the armature of the circuit controlling magnet in its attracted position where it must remain even through the magnet 174 is immediately deenergized. The motor thus has to continue in operation until the switch blades 179 and 180 are parted at the end of a complete cycle of operation which in this case corresponds to a 60° movement of the shaft 134. At the end of that movement, the stop projection 175 falls into one of the notches, and the movement of the parts is thus stopped in a yielding manner by the spring 185 so as to again energize this spring ready to snap the stop collar through its limited movement as soon as it is again released.

When the projection 175 is riding on the cylindrical surface of the collar, the armature is preferably engaged against the lower surface 191 of the core of the circuit controlling magnet as shown in Fig. 16 so that all vibration of the armature is prevented. To permit adjustment of this engagement, the armature is adjustably mounted by means of the threaded screw 192 and the nuts 193 that locate the screw with relation to the supporting bracket 194. This bracket is fixed to the bar 113 and the lower end of the bracket pivotally supports the armature preferably by means of a pin 195.

The blades 177, 179 and 180 of the circuit controlling magnet switches are so designed that when the armature of the magnet is attracted, as shown in Fig. 16, the spring force created by the flexing of blades 179 and 180 tending to hold the armature away from the magnet will not be excessive. With a limited spring force, the armature will not vibrate as the current value rises and falls in the magnet coil and objectionable chatter and buzzing of the armature will be prevented. The blade 177 is preferably of heavier stock, and blade 179 of lightest stock. The blades 177 and 179 may for example, be made .016" and .008" in thickness respectively, while blade 180 may be .010" in thickness so that the spring pressure created by blade 179 is not very great although good electrical contact is assured by the wiping action of the contact points.

Referring now to the diagrams of Figs. 13 and 14, it will be noted that when the motor controlling switch 170 is closed, as shown in Fig. 14, the circuit controlling magnet 174 is energized, which relieves the stop from the notch on the shaft collar and closes the switch blades 179 and 180 and connects the motor across the secondary of the transformer. When the motor runs, the contact arm 151 sweeps over one group of contacts on the periphery of the insulating disk, causing the successive energization of the solenoids and producing a predetermined sequence of sounds. After the completion of a definite angular travel of the shaft 134 the device will automatically stop, as the armature circuit will be broken, this stopping movement taking place in a positive although yielding manner so that it will be impossible for the contact arm 151 to overrun sufficiently to reach the first one of the next succeeding group of contacts.

When the magnet 174 is energized it has this additional effect. It breaks the circuit normally provided between the blade 179 and the blade 177. These blades are arranged in a circuit from the transformer secondary through lead 164, connection 165, lead 166, blade 179, blade 177, lead 198 to connection 199 which is connected to the normally live wire 200 extending to additional switches preferably manually controlled and provided at desirable points for selectively and manually controlling the operation of the several solenoids. These switches are arranged so as to connect this normally live wire 200 to one or more of the solenoids. The return circuits from the solenoids is through the lead 160, connection 161, back to the transformer. It will be noted that the blades 177 and 179 form a part of the connections from the transformer to the normally live wire 200 so that when the blade 179 is pressed over to the right, away from the blade 177, the wire 200 will no longer be energized. This insures that the additional switches which have been designated by the numerals 205 to 208 for selectively and individually controlling the solenoids cannot affect the apparatus as long as the motor is in operation. When the motor is stopped, however, the connections from the transformer secondary to the normally live wire 200 will again be completed so as to place the apparatus under the control of the switches 205 to 208. These individual switches may be placed at a convenient place or places and arranged so that one switch controls one solenoid; or one switch may control a plurality of solenoids at the same time. The switches 205 and 206 may be arranged at the back door and side door of the building, for example, and the switches 207 and 208 may be arranged at other convenient points to form a call system so that a particular chime tube or tubes can be sounded from a remote point. Fig. 13 shows the various connections and circuit paths when the switch 207 is closed.

In addition to the individual selective switches 205–208, other means may be provided for the control of the chimes. Thus a series of individual switches 210 to 213 inclusive, arranged in a common supporting member 214 can be provided, so that the chime tubes may be played, without energizing the motor, and merely by pushing the individual buttons of the switches 210–213 to give a pleasing sequence of notes. These switches are connected by a cable 216 to a terminal plug 217 adapted to be plugged into the receiving socket 218 which is provided as an electrical part of the chime apparatus. The switches 210 to 213 may energize the solenoids by connecting them to the normally live wire 200 if the switch blade 177 is engaged by the blade 179, these blades forming an interrupting means preventing the chimes from being affected by the several individual switches when the motor is operating.

The several connections 161, 165, 172, and 199 are provided on an insulating block 220, these connections comprising metal plates secured to the block and electrically connected to the internal wiring of the apparatus. The block 220 is mounted on two outwardly projecting straps 223 that are stamped out from the plate 108. This plate may also have an additional strap as indicated at 224.

225 indicates another outwardly projecting strap portion that forms a support for a friction brake member which rubs on the side of one of the gears in order to control the speed of the motor. As shown in Figs. 5, 6 and 7, the friction brake comprises a flexible spring blade 226 having a friction pad 227 that bears against the gear 129. In the bracket is threaded a screw 228 that adjusts the pressure of the blade 226 on the gear. The lower end of the blade portion is secured to the lower end of the strap portion 225. The spring blade provides a braking force of an adjustable character permitting changes in the speed of operation, and in addition it has the further effect of helping to prevent reverse movements of the motor armature such as might unwind the spring 185 at the end of a cycle of operations to such an extent that the stop notch in the collar 183 would not spring past the armature projection 175 when the armature is attracted.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an electric chime of the character described, an electric motor having a rotatable armature, manually controlled means for starting the motor, an arm rotated by said armature, a fixed contact disk having a series of spaced contacts flush with the peripheral edge of the disk, a contact element on said arm, a spring urging said contact element toward the center of said disk so as to maintain the contact element on the disk periphery, solenoid chime strikers having electrical connections to said spaced contacts so as to be selectively energized as said arm moves along the periphery of the disk, and a chime member for each of said chime strikers.

2. In an electric chime of the character described, a shaded pole induction disk motor adapted to be connected to a low voltage alternating current source, means for starting said motor, an arm rotated by said motor, a fixed contact disk having a series of spaced contacts flush with the peripheral edge of the disk, a contact element on said arm, a spring urging said contact element toward the center of said disk so as to maintain the contact element on the disk periphery, solenoid chime strikers having electrical connections to said spacer contacts so as to be selectively energized as said arm moves along the periphery of the disk, and a chime member for each of said chime strikers.

3. In an electric chime of the character described, a motor adapted to be connected to a low voltage alternating source, a manually operated switch for starting said motor, an arm rotated by said motor, a fixed contact disk having a series of groups of contacts flush with the peripheral edge of the disk, a contact element arranged on said arm so as to contact resiliently against the peripheral edge of the disk, chime strikers selectively energized by said contacts, a chime member for each of said chime strikers, each chime striker being electrically connected to one of the contacts of each group of contacts, and means for automatically stopping the motor after the arm has swept over one group of contacts.

4. In an electric chime of the character described, an electric motor having a rotatable armature, manual means controlling the energization of said motor including a pair of contact fingers and an electromagnet having an armature controlling said contact fingers, a shaft operated by said motor having a series of slots adapted for cooperation with the electromagnet armature so as to stop the motor when the said armature is in engagement with a slot, an arm operated by the motor armature, a contact disk having groups of contacts flush with the peripheral edge thereof and adapted to be swept over by said arm, the grouping of the contacts on said disk being similar to the spacing of said slots so that the motor will be stopped automatically after the arm sweeps over one group of contacts, solenoid chime strikers connected to said contacts, and a chime member for each of said strikers.

5. In an electrically operated chime of the character described, a series of chime members, a solenoid including a coil and a plunger for each chime member, a plurality of contacts for each coil, a fixed disk containing said contacts arranged in groups and flush with the surface of the disk, an electric motor having a rotatable element, a shaft operated by said element and having a series of slots corresponding in number to the number of the contact groups, an arm operated by said shaft and having a contact element adapted to sweep over the contacts on said disk, a stop element adapted to engage said slots and having cooperating switch means for closing the motor circuit when said stop element is not in engagement with a slot, and an electro-magnet for moving said stop element out of engagement with a slot.

6. In an electrically operated chime of the character described, a series of chime members, a solenoid including a coil and a plunger for each chime member, a plurality of contacts for each coil, a fixed disk containing said contacts arranged in groups and flush with the surface of the disk, a shaded pole induction disk motor adapted to be energized by low voltage alternating current, said motor having a rotatable armature, a rotatable motor operated shaft movably carrying a sleeve having a series of slots, an arm operated by said shaft and having a contact element adapted to sweep over the contacts on said disk, a stop element adapted to engage said slots and having cooperating switch means for closing the motor circuit when said stop element is not in engagement with a slot, and an electro-magnet for moving said stop element out of engagement with a slot.

7. An electrically operated chime of the character described comprising a series of chime members of different tones, a solenoid including a coil and a plunger for each of said chime members, a plurality of contacts for each coil arranged annularly on a contact disk, an electric motor, an energizing circuit for said motor, a motor starting switch, an arm operated by said motor and adapted to sweep over said contacts, a spring, and a mechanical stop for positively stopping said electric motor through said spring after said arm has swept over a predetermined number of said contacts, the spring acting to instantly release said motor when the motor starting switch is closed.

8. An electrically operated chime of the character described comprising a supporting plate, a series of chimes mounted on one side of said supporting plate, mechanism mounted on the other side of said supporting plate for selectively striking said chimes in a predetermined manner, a manually operated switch controlling said mechanism, a vertically elongated cabinet in the upper portion of which said plate is mounted, said cabinet having side walls extending along opposite sides of said chime members and having a vertical wall to the rear of said members, a top wall, and a front wall extending down to a point below the upper ends of said chime members from said top wall.

9. An electric chime of the character described comprising a cabinet having vertical side walls and a rear wall, a chime support mounted on said walls and including a supporting plate having chime tubes supported from one side thereof, and chime operating mechanism supported from the other side thereof, and a movable closure member for the upper front portion of said cabinet extending down to a point below the upper ends of said chime tubes.

10. An electric chime of the character described comprising a cabinet having vertical side walls and a rear wall, a chime support mounted on said walls and including a supporting plate having chime tubes supported from one side thereof, and chime operating mechanism supported from the other side thereof, said cabinet having a rear wall spaced forwardly from the rear side of the side walls, and wiring extending up from a bottom portion of said cabinet to the rear of said back wall and connected to said chime operating mechanism.

11. An electric chime of the character described comprising a cabinet having vertical side walls and a rear wall, a chime support mounted on said walls and including a supporting plate having chime tubes supported from one side thereof, and chime operating mechanism supported from the other side thereof, said cabinet having a rear wall spaced forwardly from the rear side of the side walls, wiring extending up from a bottom portion of said cabinet to the rear of said back wall and connected to said chime operating mechanism, and a movable closure member for the upper front portion of said cabinet extending down to a point below the upper ends of said chime tubes.

12. In an electrically operated chime of the character described, a supporting plate, operating mechanism provided on one side of said plate, a series of chimes on the other side of said plate, a rigid triangular chime hanger for each of said chimes, flexible means for supporting the chime tubes extending over each chime hanger and through the upper end of a chime tube, and means rigidly securing the upper end of each chime hanger to said supporting plate.

GISBERT L. BOSSARD.